(12) United States Patent
Mileti

(10) Patent No.: US 9,862,142 B2
(45) Date of Patent: Jan. 9, 2018

(54) VARIABLE TEMPERATURE SEAL ELEMENT

(71) Applicant: Robert J. Mileti, Torrington, CT (US)

(72) Inventor: Robert J. Mileti, Torrington, CT (US)

(73) Assignee: Trlby Innovative LLC, Torrington, CT (US)

( * ) Notice: Subject to any disclaimer, the term of this patent is extended or adjusted under 35 U.S.C. 154(b) by 0 days.

(21) Appl. No.: 15/296,776

(22) Filed: Oct. 18, 2016

(65) Prior Publication Data

US 2017/0036391 A1    Feb. 9, 2017

Related U.S. Application Data

(62) Division of application No. 13/708,384, filed on Dec. 7, 2012, now Pat. No. 9,481,152.

(Continued)

(51) Int. Cl.
*B32B 37/00* (2006.01)
*B29C 65/22* (2006.01)
(Continued)

(52) U.S. Cl.
CPC ............. *B29C 65/224* (2013.01); *A61J 1/10* (2013.01); *A61J 1/1475* (2013.01); *B23H 9/00* (2013.01); *B29C 65/228* (2013.01); *B29C 66/1122* (2013.01); *B29C 66/3472* (2013.01); *B29C 66/43121* (2013.01); *B29C 66/53262* (2013.01); *B29C 66/53263* (2013.01);
(Continued)

(58) Field of Classification Search
CPC . B29C 65/224; B29C 65/228; B29C 66/1122; B29C 66/3472; B29C 66/43121; B29C 66/53262; B29C 66/53263; B29C 66/73921; B29C 66/81262; B29C 66/83221; B33Y 10/00; B33Y 80/00; A61J 1/10; A61J 1/1475; B23H 9/00; B32B 37/06; H01C 17/06; H05B 3/22; H05B 3/42
USPC .......................................................... 156/228
See application file for complete search history.

(56) References Cited

U.S. PATENT DOCUMENTS 4,650,452 A    3/1987  Jensen
4,872,766 A    10/1989 Dancy
(Continued)

FOREIGN PATENT DOCUMENTS

EP     0095915 A1    12/1983
EP     1837161 A1    9/2007

*Primary Examiner* — James Sells
(74) *Attorney, Agent, or Firm* — St. Onge Steward Johnston & Reens, LLC

(57) ABSTRACT

Devices and methods for fusing materials using a heating element, where the overall mass to be sealed varies along the length of the seal. According to the invention, the heating element has a different profile in different areas. According to some aspects, the thickness and/or cross section of the heating element is different in different areas so that when a current is passed through the heating element, each area heats to a different degree. In some aspects, the heating element is shaped to conform to the shape of the parts to be fused together. The transition between areas of different thickness or cross-sectional area, or between areas of different shape may be sharply defined. This abrupt transition may be created by machining the heating element to a finished shape rather than bending flat stock to shape.

41 Claims, 11 Drawing Sheets

Related U.S. Application Data

(60) Provisional application No. 61/568,000, filed on Dec. 7, 2011.

(51) Int. Cl.

| | | |
|---|---|---|
| *B32B 37/06* | (2006.01) | |
| *B33Y 80/00* | (2015.01) | |
| *A61J 1/14* | (2006.01) | |
| *B29C 65/00* | (2006.01) | |
| *H05B 3/42* | (2006.01) | |
| *B23H 9/00* | (2006.01) | |
| *A61J 1/10* | (2006.01) | |
| *B33Y 10/00* | (2015.01) | |
| *H01C 17/06* | (2006.01) | |
| *H05B 3/22* | (2006.01) | |
| *B29L 31/60* | (2006.01) | |
| *B29L 31/00* | (2006.01) | |

(52) U.S. Cl.
CPC .. *B29C 66/73921* (2013.01); *B29C 66/81262* (2013.01); *B29C 66/83221* (2013.01); *B32B 37/06* (2013.01); *B33Y 10/00* (2014.12); *B33Y 80/00* (2014.12); *H01C 17/06* (2013.01); *H05B 3/22* (2013.01); *H05B 3/42* (2013.01); *B29C 66/81241* (2013.01); *B29L 2031/602* (2013.01); *B29L 2031/7148* (2013.01); *H05B 2203/017* (2013.01); *Y10T 29/49083* (2015.01); *Y10T 29/49099* (2015.01)

(56) References Cited

U.S. PATENT DOCUMENTS

| | | | |
|---|---|---|---|
| 5,484,375 | A | 1/1996 | Owensby et al. |
| 6,425,848 | B2 | 7/2002 | Bell et al. |
| 7,307,247 | B2 | 12/2007 | Bower et al. |
| 8,574,390 | B2 | 11/2013 | Vess |
| 2009/0184108 | A1 | 7/2009 | O'Connor |
| 2010/0175824 | A1* | 7/2010 | Hopkins ............... H05B 3/34 156/249 |
| 2012/0028057 | A1* | 2/2012 | Aihara ............... C04B 35/6269 428/457 |
| 2012/0241074 | A1 | 9/2012 | Parkinson |
| 2012/0279647 | A1* | 11/2012 | Staiger ............... B29C 65/3644 156/272.2 |

* cited by examiner

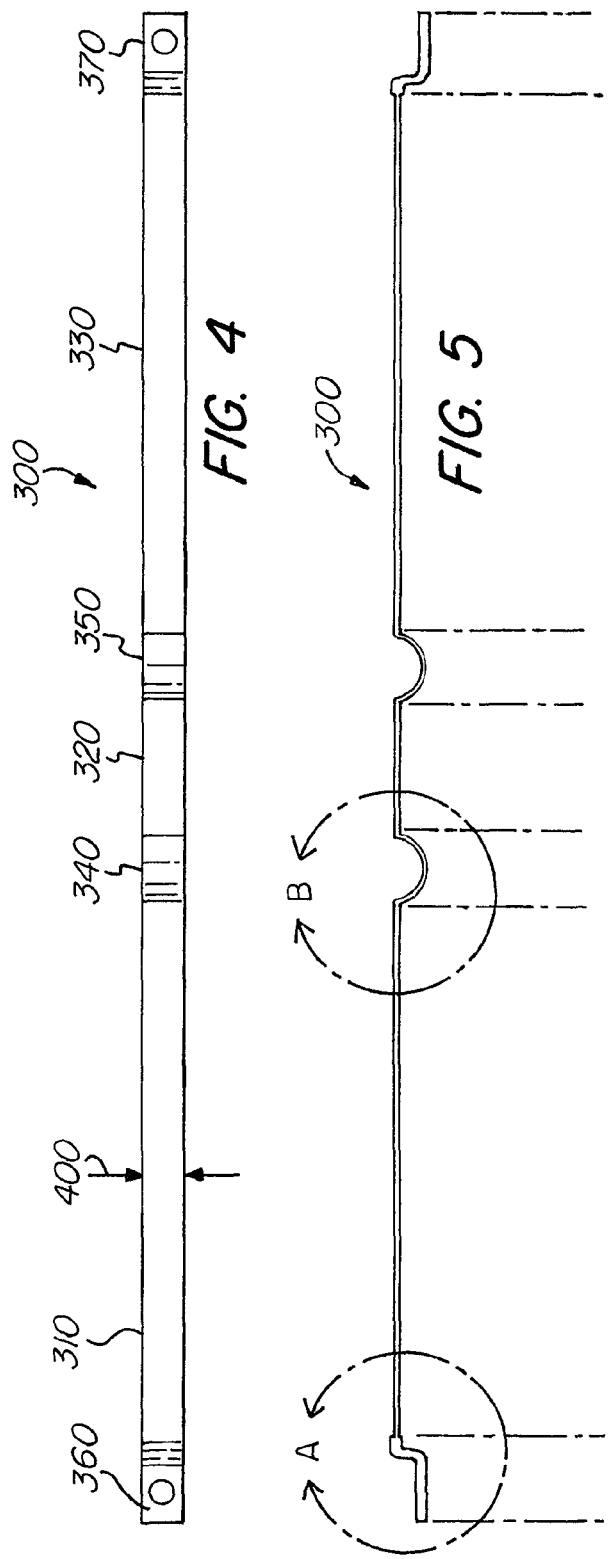

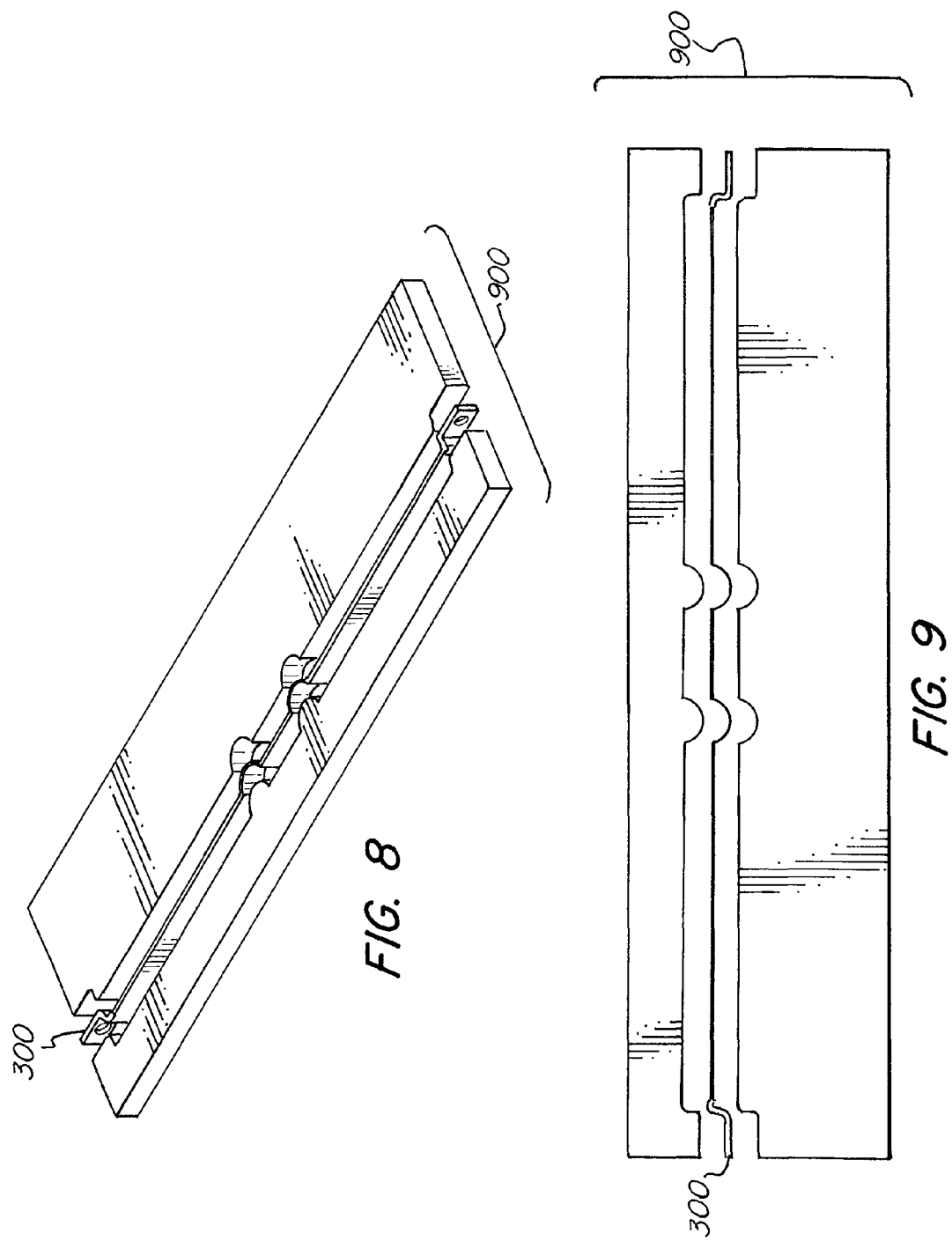

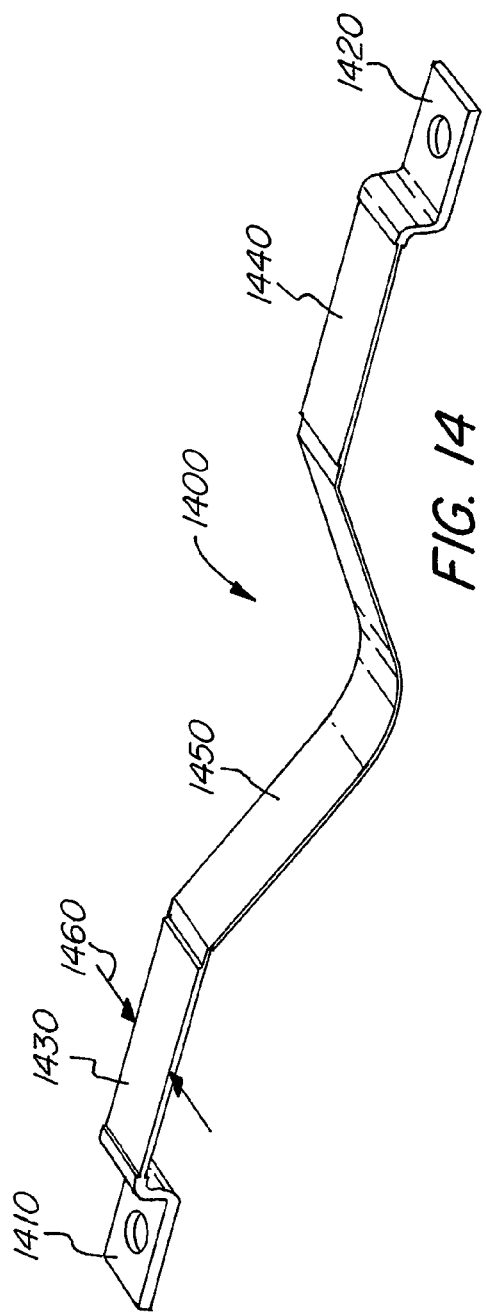
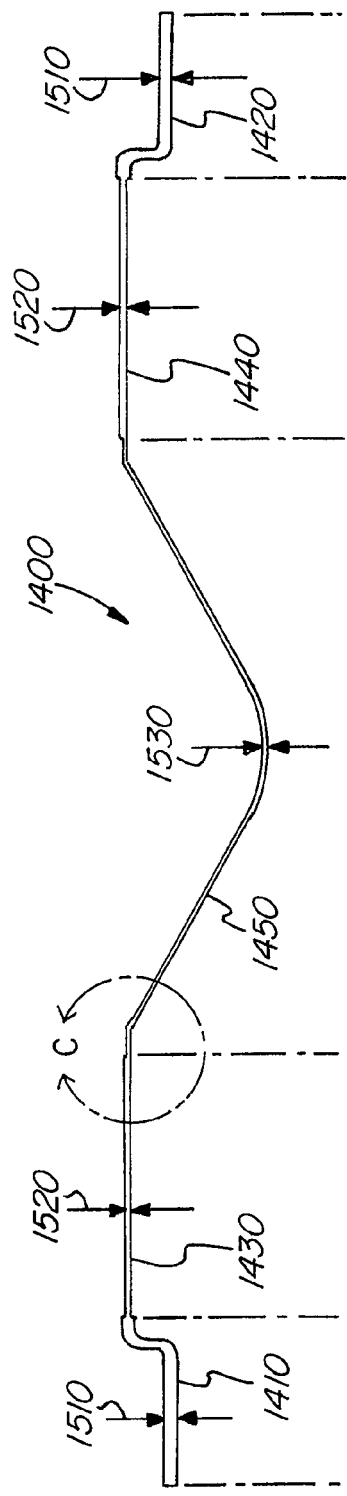
FIG. 14
FIG. 15

VARIABLE TEMPERATURE SEAL ELEMENT

FIELD OF THE INVENTION

The subject invention relates to systems and methods for heat sealing. More particularly, the subject invention relates a sealing element with an engineered profile to allow for targeted areas of different temperature to be contemporaneously created on the same element during the sealing process.

BACKGROUND OF THE INVENTION

A heat sealer is a machine used to seal products and packaging by joining materials using heat. The basic concept is to join two thermoplastic components by applying heat and pressure until the materials melt and flow together, then allowing the components to cool.

There are several different types of heat sealing devices. One particular class of devices, called impulse heat sealers, operates by holding the materials to be joined between jaws that contain one or more resistive heating elements. The materials are held in place by pressure, and heat is applied to the materials by applying an electric current to the heating elements until the materials reach a desired temperature. The heat is maintained until enough time has passed for the materials to flow together adequately. The materials are then allowed to cool, sometimes with the aid of a cooling mechanism, which allows the materials to fuse together.

The strength and quality of the seal that is formed is largely a result of using properly designed components with appropriate materials, and applying correct amounts of temperature and pressure for an appropriate amount of time.

A typical heat sealing application involves fusing two thermoplastic sheets or films to create a bag. In the simplest bags, the sheets are uniform monolayers, and a heat sealer is used to create fused edge seals.

In an application where flat films are fused, the resistive heating elements used in the heat sealer are usually straight pieces of drawn wire or ribbon that are made from a suitable material such as nichrome. The uniform cross-sectional area of such heating elements results in a uniform temperature along the element. This is due to the uniform current density that arises in the uniform resistive element at steady state when current is passed through the element. Such elements function well in simple applications because the materials to be sealed are of a uniform material and thickness.

It is sometimes desirable to seal more complex arrangements of materials. One such application is to seal an object or objects between two sheets such that the sheets form a bag, and such that the object or objects protrude out of the bag through the seal. In these more complex applications, the sheets may be sealed together in places, and sealed to the objects in other places. An example of such a complex application is shown in FIG. 1, where tubes are sealed between two poly sheets to form a medical IV bag with two ports. However this added complexity of construction has a number of implications for creating the seal.

One problem that arises is that unlike the simple case of sealing two flat films, the materials to be sealed are not uniform in mass, thickness, and/or melting or heat-sinking properties. This means that the heating requirements to form a proper seal are different along the length of the seal. For example, in FIG. 1, the portions of the seal which fuse only the two films will require less heat energy to form the seal than the portions which fuse the tubes between the films. This is because the mass of the tubes requires more heat to melt, and also acts as a heat sink, drawing heat away from the films.

Because of these effects, a standard heating element having a uniform cross-sectional area may yield undesirable results when sealing complex arrangements of components. This is because in order to use a standard heating element to form the seal, either the temperature, the time the heat is applied, or both must be increased in order to ensure that a seal is formed in the areas of increased mass.

However, none of these solutions is desirable from a production standpoint. By increasing the heating time, production is slowed and energy costs increase. Further, increased heating time alone may not be adequate in certain circumstances where higher mass parts dissipate heat into the environment rapidly. By increasing the temperature of the element, production speed may be maintained, but the temperature required to seal areas of greater mass may be too great for thinner thermoplastic components. This can result in deformation of the finished product, unreliable seals, degradation of materials, and so forth. The excess heat applied to the thinner regions in order to adequately heat the thicker regions also represents increased energy that is wasted.

Another problem in such applications arises due to the complex shape of the seal. In order to properly apply heat to the surfaces to be joined, the heating element must be shaped to follow the contours of the desired seal, which includes the parts that protrude through the seal. Typically, this is done by simply bending the wire or ribbon of resistive material into the proper shape. However, bending the element in this way can yield inadequate results.

One issue arises if the bending process is not adequate to create a sharp transition between sections of the element having different shapes. This may prevent the heating element from making proper contact with the components to be sealed in the "corners" between profile shapes, thus negatively affecting the bond.

Another issue arises if the bending process at a sharp corner strains the material locally, resulting in a thinning or distortion of the heating element at that point. This may result in an increase in temperature at the corners between shapes due to locally increased current density, which may negatively affect the bond or damage the materials.

Many other complex arrangements of materials are possible, all of which implicate the issues identified above. For example, it may be desirable to seal an article having multiple layers, having gussets in discrete areas, having areas of dissimilar materials, or having fitments or tabs (such a s a hang tag) sealed into the article. It may also be desirable to apply a "cut/seal", where an area of the sealer cuts through the materials using added heat and/or pressure.

What is desired, therefore, is a single resistive heat sealing element which possesses the true shape desired, and which also allows for a targeted temperature profile to be created therealong (i.e., higher temperatures in areas of film-to-tube sealing and lower temperatures in areas of film-to-film sealing).

SUMMARY OF THE INVENTION

The inventive concepts described above can be readily adapted for any number of other similar applications. For example, the inventive sealing element can also be used in applications where solid elements (such as, for example, rows of slats, rods, bars, or the like) instead of or in addition to hollow tubes and/or port fitments or the like are to be sealed between layers of film.

Accordingly, it is an object of the present invention to provide a single resistive heat sealing element having an engineered profile. It is a further object of the present invention to provide a resistive heat sealing element.

These and other objectives are achieved by providing a heat sealer for fusing components; having a heating element; an electrical power source connected to the heating element; and, a holder configured to position the components with respect to the heating element; wherein: the heating element comprising a resistive material having a first end and a second end; a first portion of the heating element exhibiting a first electrical resistance; a second portion of the heating element exhibiting a second electrical resistance that is different from the first electrical resistance; and, wherein when electrical current is passed through the heating element, the first portion and the second portion generate different heat levels In some embodiments, an amount of heat transferred to the components from the first portion is greater than an amount of heat transferred to the components from the second portion.

In some embodiments, the first portion and the second portion are joined at a transition such that the first resistance transitions to the second resistance at the transition.

In some embodiments, the first portion has a first cross-sectional area; and, the second portion has a second cross-sectional area that is greater than the first cross-sectional area. Optionally, the cross-sectional area of at least one of the first portion or the second portion varies along its length. Optionally, a cross-sectional area of the heating element transitions immediately from the first cross-sectional area to the second cross-sectional area at the transition.

In some embodiments, the first portion and the second portion have an equal width; the first portion has a first thickness; and, the second portion has a second thickness that is greater than the first thickness.

In some embodiments, the first portion has a first curvature and the second portion has a second curvature that is different than the first curvature.

In some embodiments, the first curvature transitions to the second curvature at the transition.

In some embodiments, the first portion is curved and the second portion is straight.

In some embodiments, the resistive material conforms to the shape of the components.

In some embodiments, the first portion conforms to a first shape of at least one of the components and the second portion conforms to a shape that is different from the first shape. Optionally, the ratio of the first thickness to the second thickness is 0.012:0.015. Optionally, the width is 0.25 inches, the first thickness is 0.012 inches, and the second thickness is 0.015 inches.

In some embodiments, the heating element is made from a homogeneous resistive material.

Other objectives are achieved by providing a heating element for use in a heat sealing device, comprising a first end and a second end; wherein a first portion of the heating element has a first electrical characteristic; a second portion of the heating element has a second electrical characteristic that is different from the first electrical characteristic; and, the first portion and the second portion are joined at a transition such that the first electrical characteristic transitions to the second electrical characteristic at the transition.

In some embodiments, the electrical characteristic is resistance.

In some embodiments, the first portion has a first cross-sectional area; and, the second portion has a second cross-sectional area that is greater than the first cross-sectional area.

In some embodiments, a cross-sectional area of the heating element transitions from the first cross-sectional area to the second cross-sectional area at the transition.

In some embodiments, the cross-sectional area of at least one of the first portion or the second portion varies along its length.

In some embodiments, the first portion and the second portion have an equal width; the first portion has a first thickness; and, the second portion has a second thickness that is greater than the first thickness.

In some embodiments, the first portion has a first curvature and the second portion has a second curvature that is different than the first curvature. Optionally, the first curvature transitions to the second curvature at the transition.

In some embodiments, the first portion is curved and the second portion is straight.

In some embodiments, the resistive material is configured to conform to the shape of the components.

In some embodiments, the first portion conforms to a first shape of at least one of the components and the second portion conforms to a shape that is different from the first shape. Optionally, the ratio of the first thickness to the second thickness is 0.012:0.015. Optionally, the width is 0.25 inches, the first thickness is 0.012 inches, and the second thickness is 0.015 inches.

In some embodiments, the resistive material is homogeneous.

Other objectives are achieved by providing a method of manufacturing a heat sealing device, comprising the steps of: providing a heating element; providing an electrical power source connected to the heating element; and, providing a holder configured to position the components with respect to the heating element; wherein the heating element has a first end and a second end and comprises a resistive material; a first portion of the heating element exhibits a first electrical resistance; a second portion of the heating element exhibits a second electrical resistance; and, wherein when electrical current from the electrical power source is passed through the heating element, the first portion and the second portion generate different heat levels.

In some embodiments, an amount of heat transferred to the components from the first portion is greater than an amount of heat transferred to the components from the second portion.

In some embodiments, the first portion and the second portion are joined at a transition such that the first resistance transitions to the second resistance at the transition.

In some embodiments, the first portion has a first cross-sectional area; and, the second portion has a second cross-sectional area that is greater than the first cross-sectional area.

In some embodiments, the cross-sectional area of at least one of the first portion or the second portion varies along its length.

In some embodiments, a cross-sectional area of the heating element transitions from the first cross-sectional area to the second cross-sectional area at the transition.

In some embodiments, the first portion and the second portion have an equal width; the first portion has a first thickness; and, the second portion has a second thickness that is greater than the first thickness.

In some embodiments, the first portion has a first curvature and the second portion has a second curvature that is different than the first curvature. Optionally, the first curvature transitions to the second curvature at the transition. In some embodiments, the first portion is curved and the second portion is straight.

In some embodiments, the resistive material is conforms to the shape of the components.

In some embodiments, the first portion is configured to conform to a first shape of at least one of the components and the second portion is conforms to a shape that is different from the first shape. Optionally, the ratio of the first thickness to the second thickness is 0.012:0.015. Optionally, the width is 0.25 inches, the first thickness is 0.012 inches, and the second thickness is 0.015 inches.

In some embodiments, the heating element is made from a homogeneous resistive material.

In some embodiments, the heating element is made using an electrical discharge machining process.

In some embodiments, the heating element is made using a process selected from the group of milling, laser beam machining, abrasive jet machining, electrochemical machining, electron beam machining, water jet machining, and 3D printing.

In some embodiments, the heating element is made without bending the resistive material.

Other objectives are achieved by providing A method of fusing materials; comprising the steps of: providing a holder configured to position at least two components together for fusing; providing a heating element configured to apply heat to the at least two components to form a seal; positioning the at least two components using the holder; and, applying an electrical current to the heating element; wherein the heating element has a first end and a second end, and comprises a resistive material; a first portion of the heating element exhibits a first electrical resistance; a second portion of the heating element exhibits a second electrical resistance; and, the first portion and the second portion generate different heat levels.

In some embodiments, the amount of heat transferred to the components from the first portion is greater than an amount of heat transferred to the components from the second portion.

In some embodiments, the first portion and the second portion are joined at a transition such that the first resistance transitions to the second resistance at the transition.

In some embodiments, the first portion has a first cross-sectional area; and, the second portion has a second cross-sectional area that is greater than the first cross-sectional area.

In some embodiments, the cross-sectional area of at least one of the first portion or the second portion varies along its length.

In some embodiments, the cross-sectional area of the heating element transitions from the first cross-sectional area to the second cross-sectional area at the transition.

In some embodiments, the first portion and the second portion have an equal width; the first portion has a first thickness; and, the second portion has a second thickness that is greater than the first thickness.

In some embodiments, the first portion has a first curvature and the second portion has a second curvature that is different than the first curvature. Optionally, the first curvature transitions to the second curvature at the transition.

In some embodiments, the first portion is curved and the second portion is straight.

In some embodiments, the resistive material is configured to conform to the shape of the components.

In some embodiments, the first portion is conforms to a first shape of at least one of the components and the second portion conforms to a shape that is different from the first shape. Optionally, the ratio of the first thickness to the second thickness is 0.012:0.015. Optionally, the width is 0.25 inches, the first thickness is 0.012 inches, and the second thickness is 0.015 inches.

In some embodiments, the heating element is made from a homogeneous resistive material.

Other objects of the invention and its particular features and advantages will become more apparent from consideration of the following drawings and accompanying detailed description.

BRIEF DESCRIPTION OF THE DRAWINGS

FIG. 4 is a top view of the sealing element shown in FIG. 3.

FIG. 5 is a side view showing a profile of the sealing element shown in FIG. 3.

FIG. 6 is a side detail view of the sealing element shown in FIG. 5.

FIG. 7 is another side detail view of the sealing element shown in FIG. 5.

FIG. 8 is another perspective view of the sealing element shown in FIG. 3.

FIG. 9 is another side view of the sealing element shown in FIG. 3.

FIG. 14 is a perspective view of another heat resistive sealing element according to aspects of the invention for fusing the cushion shown in FIG. 13 according to aspects of the invention.

FIG. 15 is a side view showing a profile of the sealing element shown in FIG. 14.

DETAILED DESCRIPTION OF THE INVENTION

Figure 1:
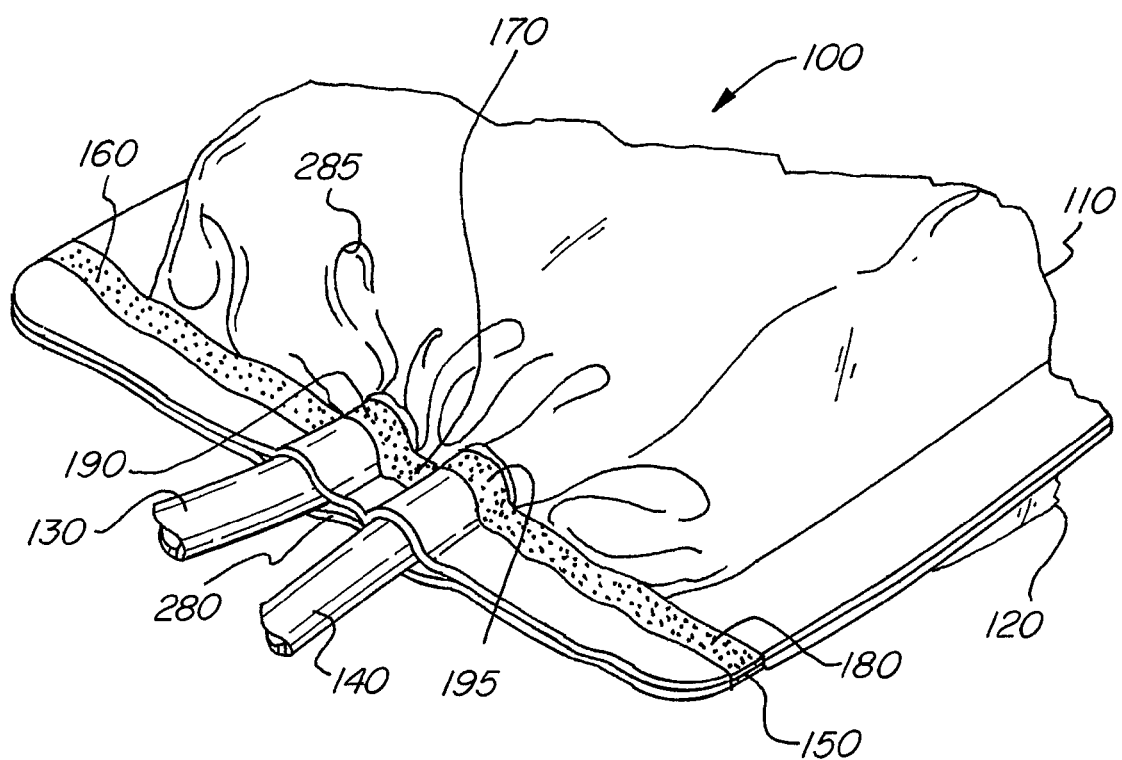
FIG. 1 is a perspective view of a medical IV bag formed by fusing thermoplastic materials.

FIG. 1 illustrates a portion of a thermoplastic medical IV bag 100 made from thermoplastic sheets 110 and 120, and having tubular ports 130 and 140. Bag 100 is made by fusing ports 130 and 140 between sheets 110 and 120 by forming a heat seal 150. Heat seal 150 has sections 160, 170, 180, 190, and 195. Those having skill in the art will appreciate that this application is not limited to use as an IV bag, and in fact many other uses and applications are possible without departing from the invention.

Heat seal 150 fuses sheets 110 and 120 directly to one another in sections 160, 170, and 180. In sections 190 and 195, heat seal 150 fuses sheets 110 and 120 to tubes 130 and 140.

Bag 100 is an example of a typical tube to bag seal construction found in many medical devices, for example. In such arrangements, a simple bag made from two film layers, along with two tubes that act as ports, are provided. The two film layers are arranged with the tubes disposed therebetween, and then peripheries of the film layers are sealed to one another, with the peripheries of the film layers also being sealed to the two tubes to create a fluid-tight pouch having two ports.

Figure 2:
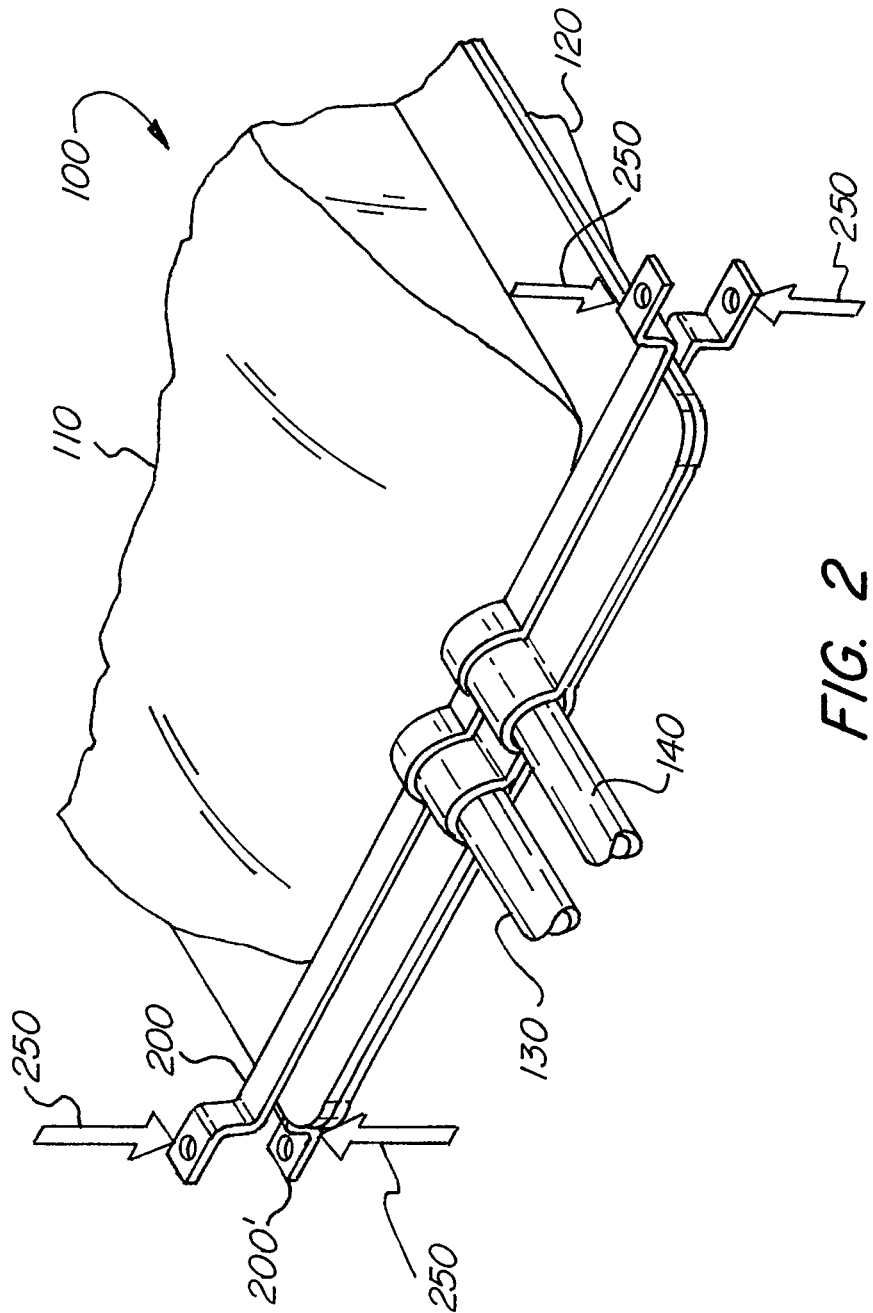
FIG. 2 is a perspective view of a known heat resistive sealing element for fusing the medical IV bag shown in FIG. 1.

FIG. 2 illustrates components of a known impulse heat sealing apparatus for creating a seal 150 as described regarding FIG. 1.

To create seal 150, heating elements 200 and 200' are first positioned with respect to bag 100 using a suitable mechanism (not shown), holding tubes 130 and 140 between sheets 110 and 120 by applying pressure in the direction indicated by arrows 250. Various holding mechanisms are known in the art, including but not limited to clamps, presses, jaws, fixtures, tooling, platens, bars and the like, and those having ordinary skill in the art will appreciate that any of these can be used without departing from the invention. Heat is applied to bag 100 by passing an electric current through elements 200 and 200'.

Heating elements 200 and 200' are shaped to accommodate the contours of tubes 130 and 140, and are made by bending a straight ribbon of resistance material with a constant cross-sectional area into shape, according to known methods. The uniform cross-sectional area of the heating elements results in a uniform temperature along each element during sealing. This is due to the constant current density that arises along the length of the elements when current is applied during sealing.

The desire is to seal tubes 130 and 140 into the edge seal 150 of the bag 100, but due to the different mass of the film versus the tubes, higher temperatures are required in the specific areas of interface 190, 195 between the film layers and the tubes, as compared to the temperatures required in the areas 160, 170, 180 where the film layers are directly sealed to one another.

Accordingly, in order to fuse tubes 130 and 140 between sheets 110 and 120, the temperature of heating elements 200 and 200' must be greater than would be required to fuse sheets 110 and 120 together. This is because the greater mass of tubes 130 and 140 requires additional heat to melt, and also acts as a heat sink.

However, the higher temperatures required to fuse tubes 130 and 140 between sheets 110 and 120 may undesirably deform bag 100, for instance, by producing shrinkage 280 (FIG. 1) in seal 150 due to overheating of the materials. This shrinkage can result in damage or undesirable puckering 285 (FIG. 1) of bag 100.

Furthermore, bending heating elements 200, 200' to shape can distort or thin the heating elements 200, 200' locally, producing a locally decreased cross-sectional area and increased temperatures due to the increased current density at the bends. This can also result in increased heating and damage.

Conversely, the bending may not be adequate to create a sharp transition between the portions of the elements 200, 200' corresponding to straight sections 160, 170, 180 and curved sections 190, 195, resulting in inadequate contact between elements 200, 200' and seal 150. This inadequate contact can result in reduced heat transfer to seal 150, and can weaken the seal.

Figure 3:
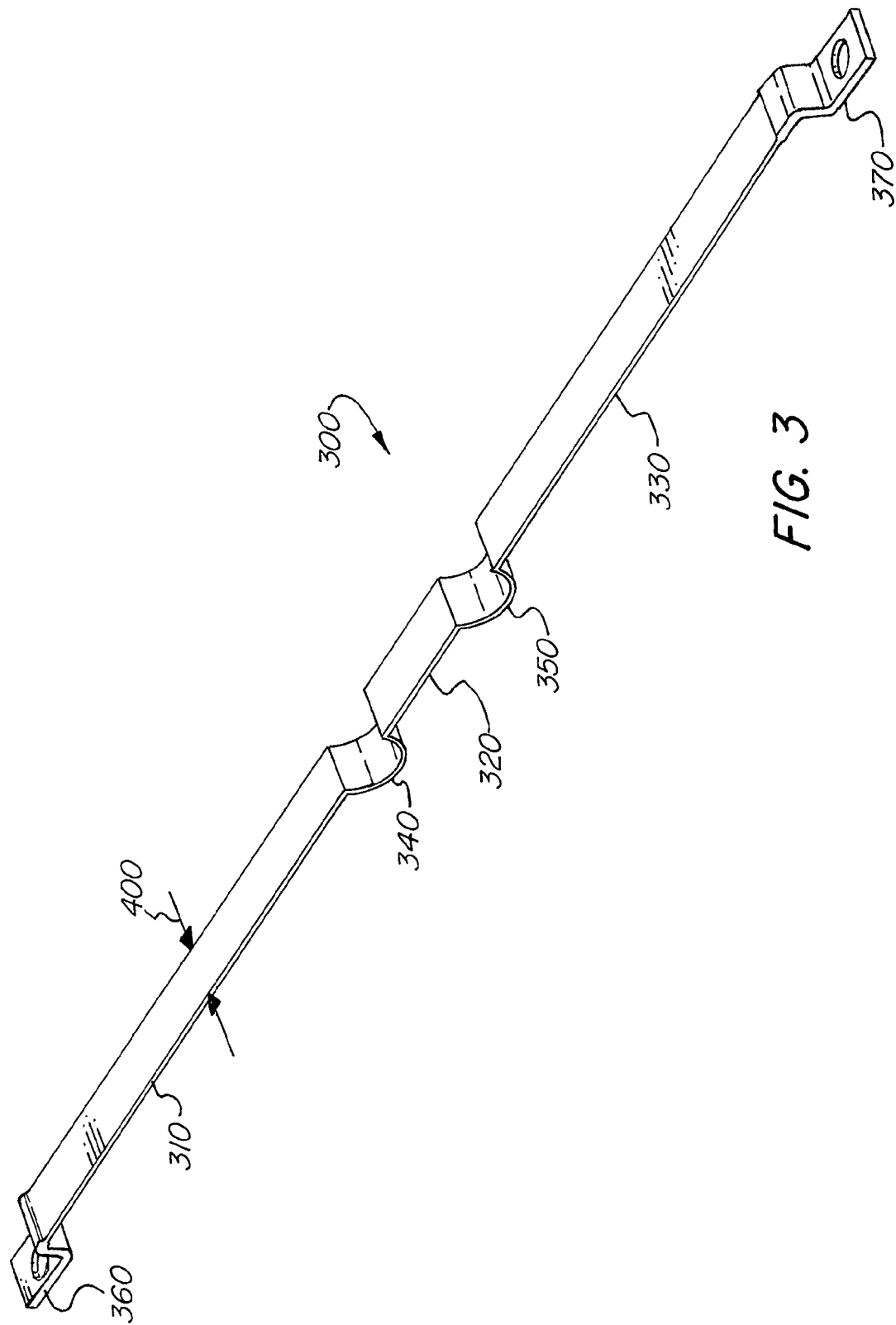
FIG. 3 is a perspective view of a heat resistive sealing element according to aspects of the invention for fusing the medical IV bag shown in FIG. 1.

FIG. 3 illustrates an example resistive heat sealing element 300 according to aspects of the invention.

Sealing element 300 may be made from nichrome or any other suitable resistive heating material known in the art. When a sufficient current is passed through sealing element 300, its temperature will rise in accordance with its material and structural properties.

Sealing element 300 includes straight portions 310, 320, and 330, curved portions 340 and 350, as well as end portions 360 and 370. End portions 360 and 370 are shown featuring mounting holes, but these may be omitted or supplemented in some implementations without departing from the invention. Sealing element 300 has a uniform width 400, although in some implementations the width may vary. Although example sealing element 300 is shown as having a linear shape, those having skill in the art will appreciate that a sealing element may have a serpentine, looped, or circular "donut" shape, such as for producing curved, circular, or other non-linear seals, without departing from the invention.

FIGS. 4 and 5 are alternate views of the sealing element 300 shown in FIG. 3. Unlike known sealing elements 200 and 200' (FIG. 2), sealing element 300 has different thicknesses at different locations along its length. For example, end portions 360 and 370 each have a thickness 610; straight portions 310, 320, and 330 each have a thickness 620; and curved portions 340 and 350 each have a thickness 630.

Thickness 610 is greater than thickness 620, and thickness 620 is greater than thickness 630. In this example, the difference in thicknesses of sealing element 300 results in a corresponding difference in cross-sectional areas. This means that when a current is passed through sealing element 300, thinner sections will exhibit increased heating due to the increased current density in those regions. Here, the end portions 360 and 370 will have the greatest cross-sectional area, and will accordingly exhibit the coolest temperatures. Curved portions 340 and 350 will have the smallest cross-sectional area, and will accordingly exhibit the highest temperatures.

In summary, it can be seen that by varying the thickness of the seal element in desired areas, a single seal element can be used to create desired temperatures in desired areas. More specifically, as can be seen in the drawings, the "flat areas" which are used to create the film-to-film seals are greater in thickness (e.g., 0.015 inches) versus the thickness (e.g., 0.012 inches) of the "curved areas" which are used to create the film-to-tube seals.

Varying the thickness of a heating element in this way can have the advantage of selectively providing increased heating to areas of higher mass and decreased heating to portions of element 300 that are not used for sealing, saving energy costs.

FIG. 6 shows detail view A of the sealing element 300 as shown in FIG. 5, illustrating a clearly defined abrupt transition 600 between end portion 360 and straight portion 310.

FIG. 7 shows detail view B of the sealing element 300 as shown in FIG. 5, illustrating a clearly defined abrupt transition 700 between straight portion 310 and curved portion 340.

According to some aspects of the invention, providing clearly defined abrupt transitions 600, 700 can have the advantage of allowing improved control of heat delivery to different portions of the seal during sealing. Such sharp transitions are possible by machining rather than bending heating element 300, as further discussed herein.

It should be noted that in some applications according to the invention, certain transitions (such as transition 600) may not be required to be sharply defined and abrupt. For example, in applications where the application of heat to the seal 150 begins in straight portion 310 and does not overlap transition 600, a sharp drop in temperature, and accordingly thickness, may not be critical.

In an example implementation, a sealing element (not shown) with a similar profile to element 300, having a width of 0.25", end thicknesses of 0.030" straight section thicknesses of 0.015" and curve thicknesses of 0.012" was analyzed. It was found that an electrical current applied to this sealing element (not shown) could result in a temperature range of over 100 degrees Fahrenheit between the straight and curved sections. It will be clear to those having skill in the art that altering these dimensions can result in greater or lesser ranges of temperatures.

This controllability of temperature along the length of a sealing element can have the advantage of improving seals by enabling more precise heat delivery to regions having different melting and/or heat-sink properties.

FIGS. 8 and 9 illustrate sealing element 300 as shown in FIGS. 3-8, wherein element 300 is shown as machined from a block of a resistive heating element material 900, according to aspects of the invention. In some implementations, material 900 is nichrome or stainless steel, although other suitable materials will be evident to those having skill in the art.

As discussed earlier, it is difficult to achieve sharp transitions between portions of a sealing element having different shapes using typical methods of bending the element to shape. This is because bending produces strain in the material which can thin or distort the element, resulting in uneven heating which can damage the parts to be sealed.

In order to avoid this problem, heating element 300 is machined from a block of resistive material 900 to create the desired shape, thicknesses, and abrupt transitions between areas of different thickness and areas of different shape.

In some implementations, sealing element 300 is machined from block 900 using an electrical discharge machining (EDM) process. However, other methods of machining are possible within the scope of invention, including but not limited to milling, laser beam machining, abrasive jet machining, electrochemical machining, electron beam machining, and water jet machining.

Machining the sealing element in this way can have the advantage of enabling sharp transitions to be created between regions of the sealing element having different thicknesses and/or different shapes.

It should be noted that according to some aspects of the invention, the machining process is not necessary, so long as the profile of the sealing element includes regions having different cross-sectional areas. According to other aspects of the invention, a sealing element may be machined from a block of resistive heating material and further processed by bending. An example of an application where a combination of machining and bending may be appropriate would be in a circumstance where a sharp transition between shapes or thicknesses is required in one portion of the heating element but not in another.

Figure 10:
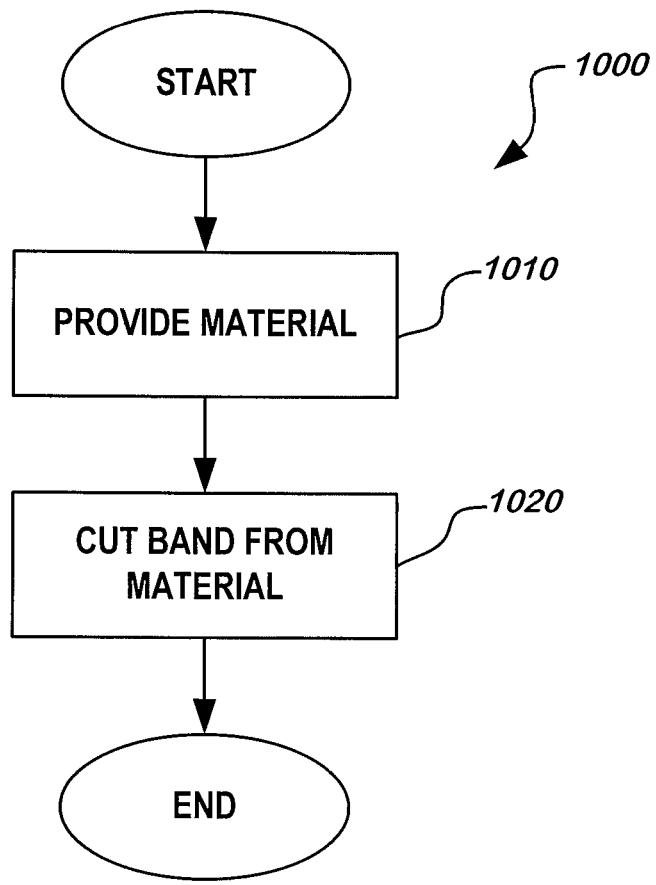
FIG. 10 is a flow chart illustrating a method of creating a sealing element according to aspects of the invention.

FIG. 10 illustrates a method 1000 of creating a sealing element according to aspects of the invention.

In step 1010, a block of resistive heating material is provided. The block of resistive heating material may be made from nichrome, stainless steel, or any other suitable resistive heating material known in the art.

In step 1020, a band of material is cut from the block of resistive heating material such that the band has a varying profile. The band of material forms a heating element that may be configured as discussed herein according to any aspect of the invention.

Figure 11:
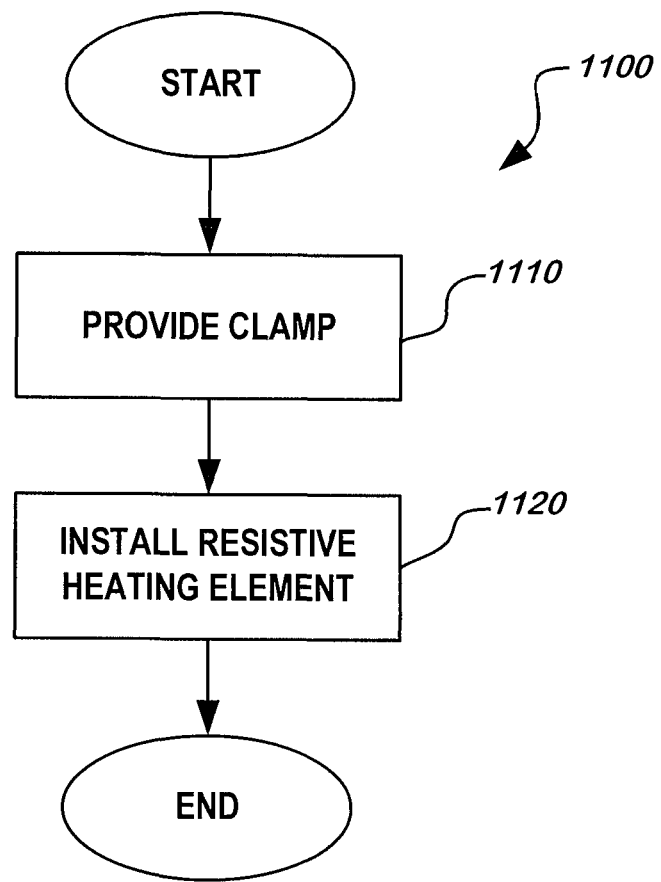
FIG. 11 is a flow chart illustrating a method of creating a heat sealing device according to aspects of the invention.

FIG. 11 illustrates a method 1100 of creating a heat sealing device according to aspects of the invention.

In step 1110, a holding device is provided, which is configured to apply pressure to at least two components. The holding device is configured such that the components can be held in a desired position for fusing. Various holding devices are known in the art, including but not limited to clamps, presses, jaws, fixtures, tooling, platens, bars and the like, and those having ordinary skill in the art will appreciate that any of these can be used without departing from the invention In step 1120, a resistive heating element is installed into the holding device and configured to heat the components when a current is applied to the resistive heating element for a desired amount of time and then allowed to cool. The resistive heating element may be configured as discussed herein according to any aspect of the invention.

Figure 12:
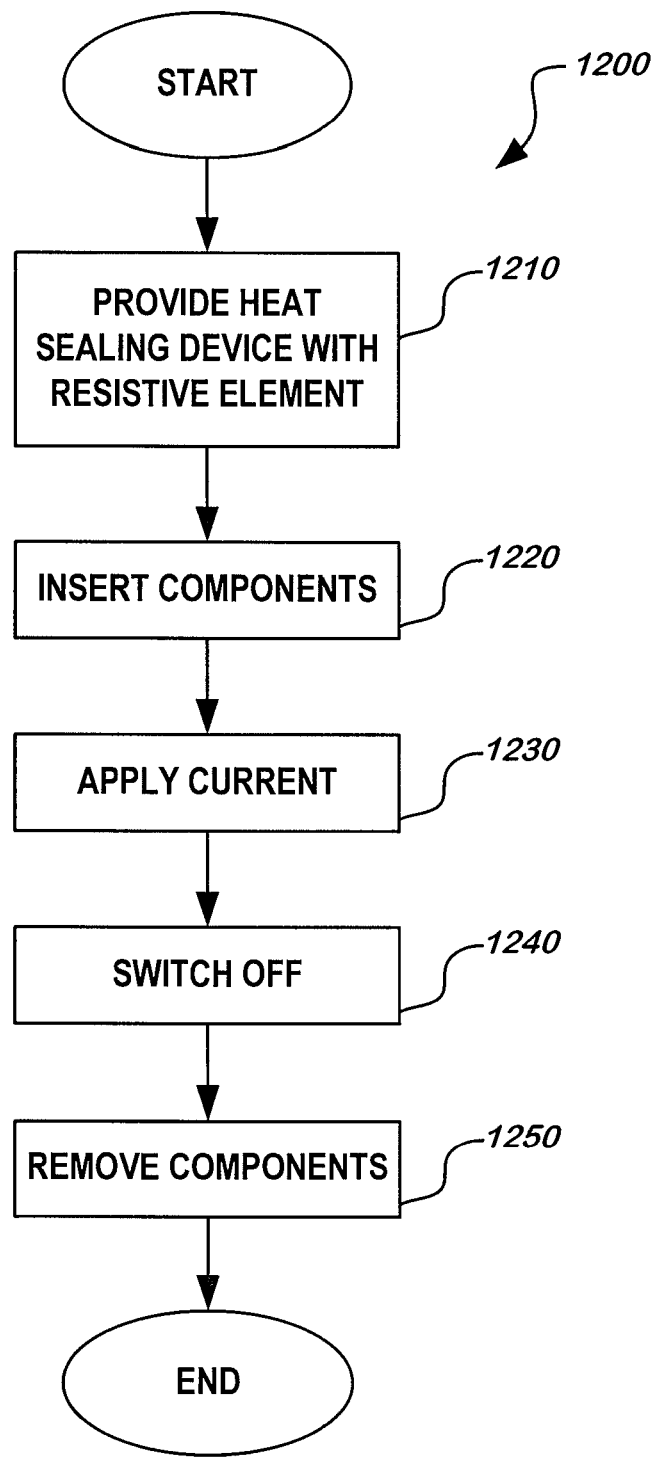
FIG. 12 is a flow chart illustrating a method of creating a seal by fusing parts according to aspects of the invention.

FIG. 12 illustrates a method 1200 of fusing parts according to aspects of the invention.

In step 1210, a heat sealing device is provided having a resistive heating element which has a shape designed to correspond with the contours of a particular arrangement of parts to be fused. The resistive heating element may be configured as discussed herein according to any aspect of the invention.

In step 1220, components desired to be fused are inserted into the heat sealing device.

In step 1230, electrical current is applied to the resistive heating element such that heat is applied to the components.

In step 1240, the current is switched off, and the components are allowed to cool.

In step 1250, the components are removed from the heat sealing device.

Figure 13:
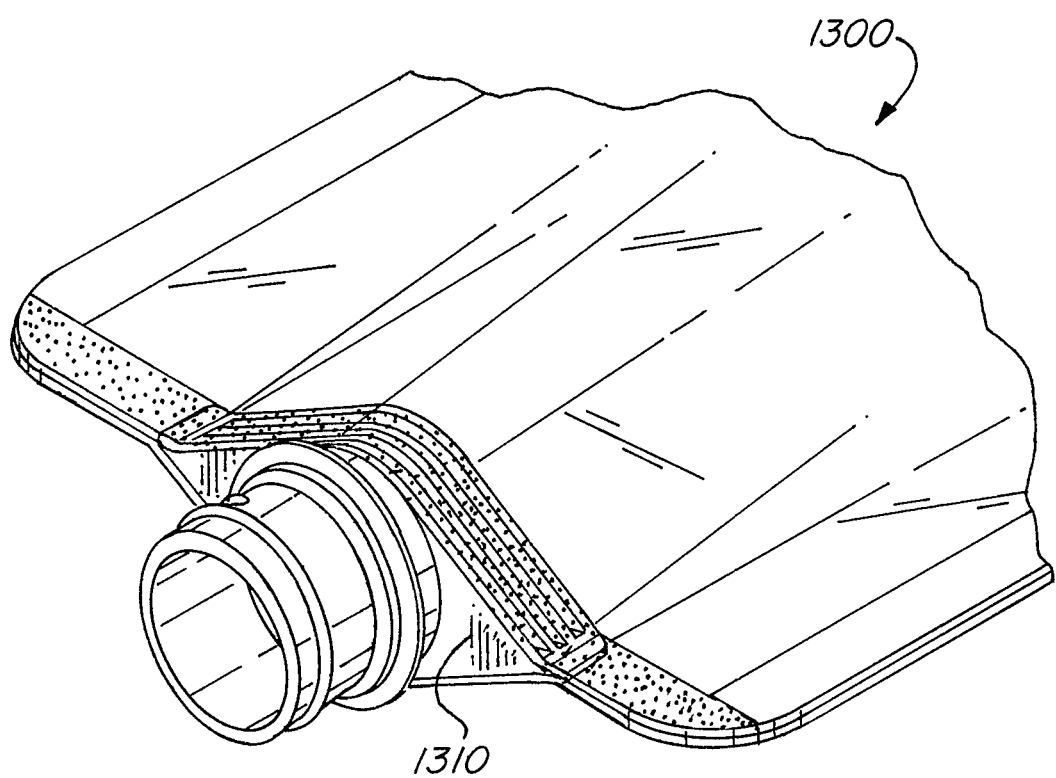
FIG. 13 is a perspective view of a portion of an inflatable cushion formed by fusing thermoplastic materials according to aspects of the invention.

FIG. 13 shows another example heat sealing application where an inflatable cushion 1300 includes a molded thermoplastic port 1310 sealed between two monolayer films. Port 1310 interacts with the seal in a similar fashion to the tubes shown in FIGS. 1 and 2, except that thermoplastic port 1310 has a different shape and mass distribution. Those having skill in the art will appreciate that this application is not limited to use as an inflatable cushion, and in fact many other uses and applications applications are possible without departing from the invention.

FIG. 14 illustrates a sealing element 1400 having a shape adapted for the application shown in FIG. 13. Sealing element 1400 has end portions 1410 and 1420, straight portions 1430 and 1440, and as a shaped portion 1450. End portions 1410 and 1420 are shown featuring mounting holes, but these may be omitted or supplemented in some implementations without departing from the invention. Sealing element 1400 has a uniform width 1460, although in some implementations the width may vary.

FIG. 15 is an alternate view of the sealing element 1400 shown in FIG. 14.

Sealing element 1400 has different thicknesses at different locations along its length. For example, end portions 1410 and 1420 each have a thickness 1510; straight portions 1430 and 1440 each have a thickness 1520; and shaped portion 1450 has a thickness 1530.

Thickness 1510 is greater than thickness 1520, and thickness 1520 is greater than thickness 1530. The variation in thicknesses of sealing element 1400 results in a corresponding variation in cross-sectional area. This means that when a current is passed through sealing element 1400, sections having a lesser thickness will exhibit increased heating due to the increased current density in those regions. Here, end portions 1410 and 1420 will have the greatest cross-sectional area, and will accordingly exhibit the coolest temperatures. Shaped portion 1450 will have the smallest cross-sectional area, and will accordingly exhibit the highest temperatures.

Varying the thickness of a heating element in this way can have the advantage of selectively providing increased heating to areas of higher mass and decreased heating to portions of element 1400 that are not used for sealing, saving energy costs.

Figure 16:
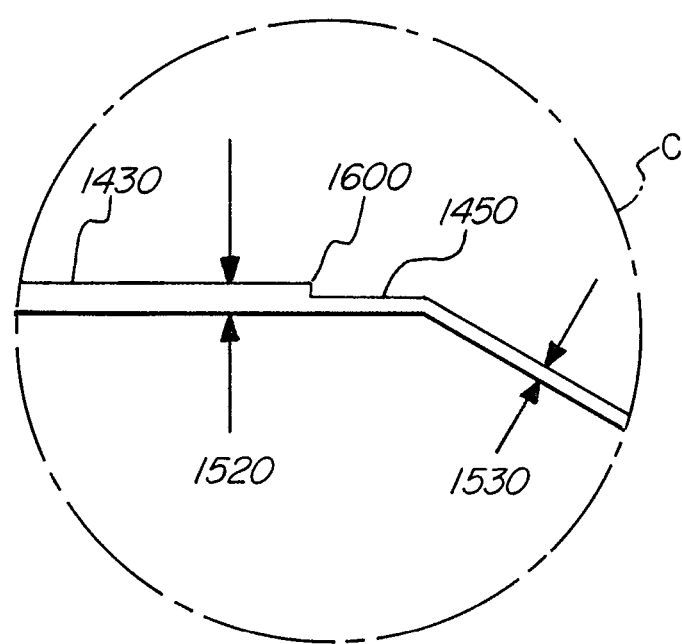
FIG. 16 is a side detail view of the sealing element shown in FIG. 15.

FIG. 16 shows a detail view C of the sealing element 1400 as shown in FIG. 16, illustrating the transition 1600 between end portion 1430 and straight portion 1450.

Providing a sharp transition 1600 between thickness 1520 and thickness 1530 can have the advantage of providing improved control of heat delivery to different portions of the seal during sealing.

Port 1310 (FIG. 13) has a profile that varies continuously between thinner and thicker portions. Accordingly, in some implementations (not shown) the thickness of shaped portion 1450 of sealing element 1400 may vary in a continuous fashion to correspond to the continuously varying profile of port 1310. This can have the added advantage of even more precisely controlling the application of heat to areas of a part having heat-sink properties that vary continuously along the length of the seal.

Although the invention has been described with reference to a particular arrangement of parts, features and the like, these are not intended to exhaust all possible arrangements or features, and indeed many modifications and variations will be ascertainable to those of skill in the art.

What is claimed is:

1. A method of manufacturing a heat sealing device, comprising the steps of:
   providing a heating element;
   providing an electrical power source connected to the heating element; and,
   providing a holder configured to position the components with respect to the heating element;
   wherein
   said heating element has a first end and a second end and comprises a resistive material;
   a first portion of said heating element exhibits a first electrical resistance;
   a second portion of said heating element exhibits a second electrical resistance; and,
   wherein when electrical current from said electrical power source is passed through said heating element, the first portion and the second portion generate different heat levels.

2. The method of claim 1, wherein:
   an amount of heat transferred to the components from the first portion is greater than an amount of heat transferred to the components from the second portion.

3. The method of claim 1, wherein
   said first portion and said second portion are joined at a transition such that the first resistance transitions to the second resistance at the transition.

4. The method of claim 1, wherein
   said first portion has a first cross-sectional area; and,
   said second portion has a second cross-sectional area that is greater than the first cross-sectional area.

5. The method of claim 4, wherein
   the cross-sectional area of at least one of said first portion or said second portion varies along its length.

6. The method of claim 4, wherein
   a cross-sectional area of the heating element transitions from the first cross-sectional area to the second cross-sectional area at the transition.

7. The method of claim 1, wherein:
   said first portion and said second portion have an equal width;
   said first portion has a first thickness; and,
   said second portion has a second thickness that is greater than said first thickness.

8. The method of claim 1, wherein
   said first portion has a first curvature and
   said second portion has a second curvature that is different than the first curvature.

9. The method of claim 8, wherein
   the first curvature transitions to the second curvature at the transition.

10. The method of claim 1, wherein said first portion is curved and said second portion is straight.

11. The method of claim 1, wherein said resistive material is conforms to the shape of the components.

12. The method of claim 1, wherein said first portion is configured to conform to a first shape of at least one of the components and said second portion is conforms to a shape that is different from the first shape.

13. The method of claim 7, wherein the ratio of the first thickness to the second thickness is 0.012:0.015.

14. The method of claim 7, wherein the width is 0.25 inches, the first thickness is 0.012 inches, and the second thickness is 0.015 inches.

15. The method of claim 1, wherein said heating element is made from a homogeneous resistive material.

16. The method of claim 1, wherein the heating element is made using an electrical discharge machining process.

17. The method of claim 1, wherein the heating element is made using a process selected from the group of milling, laser beam machining, abrasive jet machining, electrochemical machining, electron beam machining, water jet machining, sintered molding, and 3D printing.

18. The method of claim 1, wherein the heating element is made without bending the resistive material.

19. The method of claim 1, wherein a first resistive coating is applied to a first area on the element.

20. The method of claim 19, wherein a second resistive coating exhibiting a resistance different from the first resistive coating is applied to a second area on the element.

21. A method of fusing materials; comprising the steps of:
   providing a holder configured to position at least two components together for fusing;
   providing a heating element configured to apply heat to the at least two components to form a seal;
   positioning the at least two components using the holder; and,
   applying an electrical current to the heating element;
   wherein
   said heating element has a first end and a second end, and comprises a resistive material;
   a first portion of said heating element exhibits a first electrical resistance;

a second portion of said heating element exhibits a second electrical resistance; and, the first portion and the second portion generate different heat levels.

22. The method of claim 21, wherein an amount of heat transferred to the components from the first portion is greater than an amount of heat transferred to the components from the second portion.

23. The method of claim 21, wherein said first portion and said second portion are joined at a transition such that the first resistance transitions to the second resistance at the transition.

24. The method of claim 21, wherein said first portion has a first cross-sectional area; and, said second portion has a second cross-sectional area that is greater than the first cross-sectional area.

25. The method of claim 24, wherein the cross-sectional area of at least one of said first portion or said second portion varies along its length.

26. The method of claim 24, wherein a cross-sectional area of the heating element transitions from the first cross-sectional area to the second cross-sectional area at the transition.

27. The method of claim 21, wherein:

said first portion and said second portion have an equal width;

said first portion has a first thickness; and, said second portion has a second thickness that is greater than said first thickness.

28. The method of claim 21, wherein said first portion has a first curvature and said second portion has a second curvature that is different than the first curvature.

29. The method of claim 28, wherein the first curvature transitions to the second curvature at the transition.

30. The method of claim 28, wherein said first portion is curved and said second portion is straight.

31. The method of claim 21, wherein said resistive material is configured to conform to the shape of the components.

32. The method of claim 21, wherein said first portion is conforms to a first shape of at least one of the components and said second portion conforms to a shape that is different from the first shape.

33. The method of claim 27, wherein the ratio of the first thickness to the second thickness is 0.012:0.015.

34. The method of claim 27, wherein the width is 0.25 inches, the first thickness is 0.012 inches, and the second thickness is 0.015 inches.

35. The method of claim 21, wherein said heating element is made from a homogeneous resistive material.

36. The method of claim 21, wherein a first resistive coating is applied to a first area on the element.

37. The method of claim 36, wherein a second resistive coating exhibiting a resistance different from the first resistive coating is applied to a second area on the element.

38. The method of claim 21, wherein the heating element is configured to cut at least one of the components while forming a seal.

39. The method of claim 38, wherein the heating element cuts the at least one of the components using heat.

40. The method of claim 21, wherein the at least two components comprise at least two folds of one object.

41. The method of claim 40, wherein the object is a thermoplastic film that has been folded to form a gusset.

* * * * *